(12) United States Patent
Liu et al.

(10) Patent No.: US 11,412,119 B2
(45) Date of Patent: Aug. 9, 2022

(54) CAMERA DEVICE AND MOBILE TERMINAL

(71) Applicant: VIVO MOBILE COMMUNICATION CO., LTD., Chang'an Dongguan (CN)

(72) Inventors: Ben Liu, Chang'an Dongguan (CN); Yong Huang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 305 days.

(21) Appl. No.: 16/625,522

(22) PCT Filed: May 11, 2018

(86) PCT No.: PCT/CN2018/086459
§ 371 (c)(1),
(2) Date: Dec. 20, 2019

(87) PCT Pub. No.: WO2019/001148
PCT Pub. Date: Jan. 3, 2019

(65) Prior Publication Data
US 2021/0368077 A1   Nov. 25, 2021

(30) Foreign Application Priority Data

Jun. 27, 2017 (CN) .......................... 201710502685.3

(51) Int. Cl.
*H04N 5/225* (2006.01)
*G01J 1/04* (2006.01)
(Continued)

(52) U.S. Cl.
CPC .......... *H04N 5/2257* (2013.01); *G01J 1/0407* (2013.01); *G01J 1/4204* (2013.01);
(Continued)

(58) Field of Classification Search
CPC .. H04N 5/2257; H04N 5/2253; H04N 5/2254; G01J 1/0407; G01J 1/4204;
(Continued)

(56) References Cited

U.S. PATENT DOCUMENTS

2009/0161215 A1   6/2009   Chan
2012/0044411 A1*  2/2012   Wang ................... H04N 5/2257
                                                    348/374
(Continued)

FOREIGN PATENT DOCUMENTS

CN        102223427 A      10/2011
CN        205610701 U       9/2016
(Continued)

OTHER PUBLICATIONS

1st Chinese Office Action for Chinese Application No. 201710502685.3, dated Jul. 11, 2018 (Jul. 11, 2018)—5 pages (English translation—7 pages).

(Continued)

*Primary Examiner* — Mekonnen D Dagnew
(74) *Attorney, Agent, or Firm* — Culhane Meadows PLLC; Stephen J. Weed

(57) ABSTRACT

A camera device and a mobile terminal are provided by the present disclosure. The camera device includes a lens module, a light-guiding tube and a photosensitive sensor; the light-guiding tube is arranged at a periphery of a light-entering hole of the lens module; the light-guiding tube is connected to the photosensitive sensor; and the photosensitive sensor is connected to a circuit board of the lens module.

16 Claims, 2 Drawing Sheets

(51) Int. Cl.
*G01J 1/42* (2006.01)
*H04M 1/02* (2006.01)

(52) U.S. Cl.
CPC ........ *H04M 1/0264* (2013.01); *H04N 5/2253* (2013.01); *H04N 5/2254* (2013.01)

(58) Field of Classification Search
CPC ........ G01J 1/00; H04M 1/0264; H04M 1/026; H04M 1/0277; H04M 2250/12
See application file for complete search history.

(56) References Cited

U.S. PATENT DOCUMENTS

| | | | |
|---|---|---|---|
| 2014/0166867 A1 | 6/2014 | Shiu et al. | |
| 2015/0334316 A1 | 11/2015 | Wang | |
| 2017/0126868 A1* | 5/2017 | Evans | G01S 17/04 |
| 2019/0394316 A1 | 12/2019 | Zhang | |

FOREIGN PATENT DOCUMENTS

| | | |
|---|---|---|
| CN | 105991807 A | 10/2016 |
| CN | 106302878 A | 1/2017 |
| CN | 106453724 A | 2/2017 |
| CN | 106657485 A | 5/2017 |
| CN | 106850898 A | 6/2017 |
| CN | 107172240 A | 9/2017 |
| KR | 20140022224 A | 2/2014 |
| WO | 2015130226 A1 | 9/2015 |

OTHER PUBLICATIONS

Extended European Search Report for European Application No. 18825534.3, dated Apr. 3, 2020 (Apr. 3, 2020)—7 pages.
International Search Report and Written Opinion for International Application No. PCT/CN2018/086459, dated Jan. 9, 2020 (Jan. 9, 2020)—10 pages (English translation—10 pages).

* cited by examiner

CAMERA DEVICE AND MOBILE TERMINAL

CROSS-REFERENCE TO RELATED APPLICATION

This application is the U.S. national phase of PCT Application No. PCT/CN2018/086459 filed on May 11, 2018, which claims a priority to Chinese Patent Application No. 201710502685.3 filed on Jun. 27, 2017, the disclosures of which are incorporated in their entireties by reference herein.

TECHNICAL FIELD

The present disclosure relates to the technical field of hardware of mobile terminals, in particular to a camera device and a mobile terminal.

BACKGROUND

With the advancement of science and technology and the continuous improvement of consumer demands, people have increasingly high requirements on the experience of using mobile terminals. Thus, more and more hardware devices are arranged in a mobile terminal. Currently, a camera device and a photosensitive sensor device are arranged in the mobile terminal. The camera device is used for photographing, and a function of the camera device is mainly to obtain pictures. The photosensitive sensor device is mainly used to detect a light intensity of an external light source.

In existing mobile terminals, the camera device is arranged separately from the photosensitive sensor device. Therefore, it is necessary to set a camera hole for the camera device and set a light-collecting hole for the photosensitive sensor device on a cover plate of the mobile terminal, which adversely affects an appearance of the whole mobile terminal.

SUMMARY

A camera device is provided according to an aspect of the present disclosure. The camera device includes a lens module, a light-guiding tube and a photosensitive sensor; the light-guiding tube is arranged at a periphery of a light-entering hole of the lens module; the light-guiding tube is connected to the photosensitive sensor; and the photosensitive sensor is connected to a circuit board of the lens module.

A mobile terminal is provided according to another aspect of the present disclosure. The mobile terminal includes the camera device according to any one of embodiments of the present disclosure; the camera device is installed inside the mobile terminal, and a camera hole is arranged on a cover plate of the mobile terminal; and both the light-entering hole and the light-guiding tube arranged at a periphery of the light-entering hole face to the camera hole.

BRIEF DESCRIPTION OF THE DRAWINGS

Those skilled in the art can clearly understand various advantages and benefits of the present disclosure, by reading detailed descriptions of optional embodiments below. The drawings are only used to illustrate the optional embodiments and are not considered as limitations of the present disclosure. Throughout the drawings, the same components are denoted by the same reference signs.

DETAILED DESCRIPTION

Figure 1:
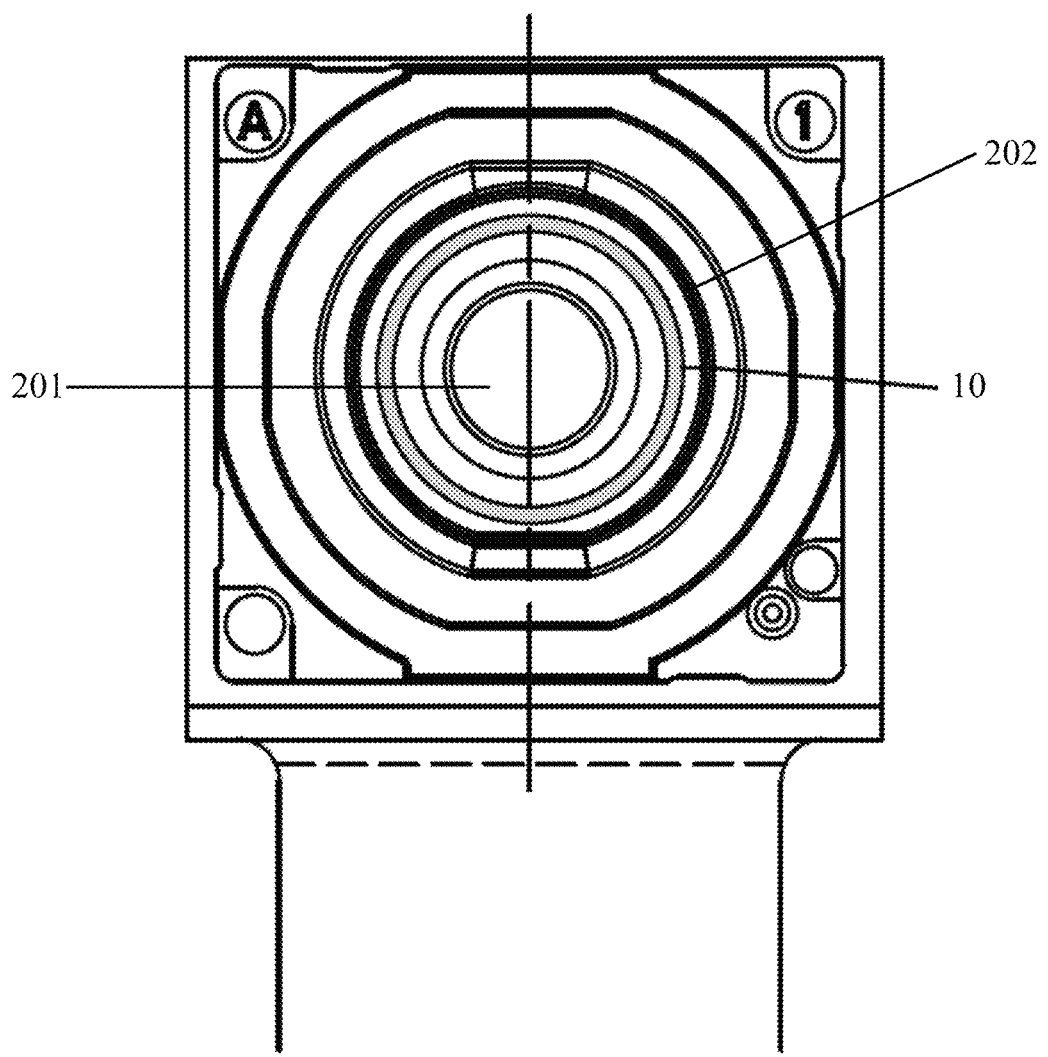
FIG. 1 is a top view of a camera device according to some embodiments of the present disclosure.

Exemplary embodiments of the present disclosure will be described in more detail below with reference to the drawings. Although the exemplary embodiments of the present disclosure are shown in the drawings, it should be understood that the present disclosure may be implemented in various forms and not limited by the embodiments described herein. On the contrary, these embodiments are provided so that the present disclosure will be more fully understood, and the scope of the disclosure can be fully conveyed to those skilled in the art.

A camera device and a mobile terminal are provided by the present disclosure to solve the problem in the related art that openings need to be arranged on a cover of the mobile terminal for the camera device and a photosensitive sensor device respectively.

FIG. 1 shows a top view of the camera device according to some embodiments of the present disclosure.

As shown in FIG. 1, the camera device according to the embodiments of the present disclosure includes a lens module, a light-guiding tube 10 and a photosensitive sensor device, and the photosensitive sensor is not shown in FIG. 1.

The lens module includes a light-entering hole 201 formed by at least one lens and a housing 202, which is used to fix the lens.

The light-guiding tube 10 is arranged at a periphery of the light-entering hole 201 of the lens module. The light-guiding tube 10 is connected to the photosensitive sensor. The photosensitive sensor is connected to a circuit board of the lens module. The light-guiding tube 10 guides light, which is received from outside, into the photosensitive sensor. After an intensity of the light is detected by the photosensitive sensor, a detected signal is transmitted to a main board of the mobile terminal through the circuit board of the lens module.

The photosensitive sensor may be arranged inside the lens module or may be arranged outside the lens module, which is not specifically limited in the embodiments of the present disclosure.

In the camera device of the embodiments of the present disclosure, the light-guiding tube is arranged at the periphery of a light-entering hole of the lens module; the light-guiding tube is connected to the photosensitive sensor. The photosensitive sensor and the circuit board of the lens module are connected with the camera device. Thus, the camera device has a picture shooting function and a light intensity detecting function. On the mobile terminal panel, it is not needed to provide openings respectively for the photosensitive sensor device and the camera device, and only one camera hole is needed to be provided, which can reduce the number of openings in a panel of the mobile terminal, thereby improving an appearance of the whole mobile terminal.

Figure 2:
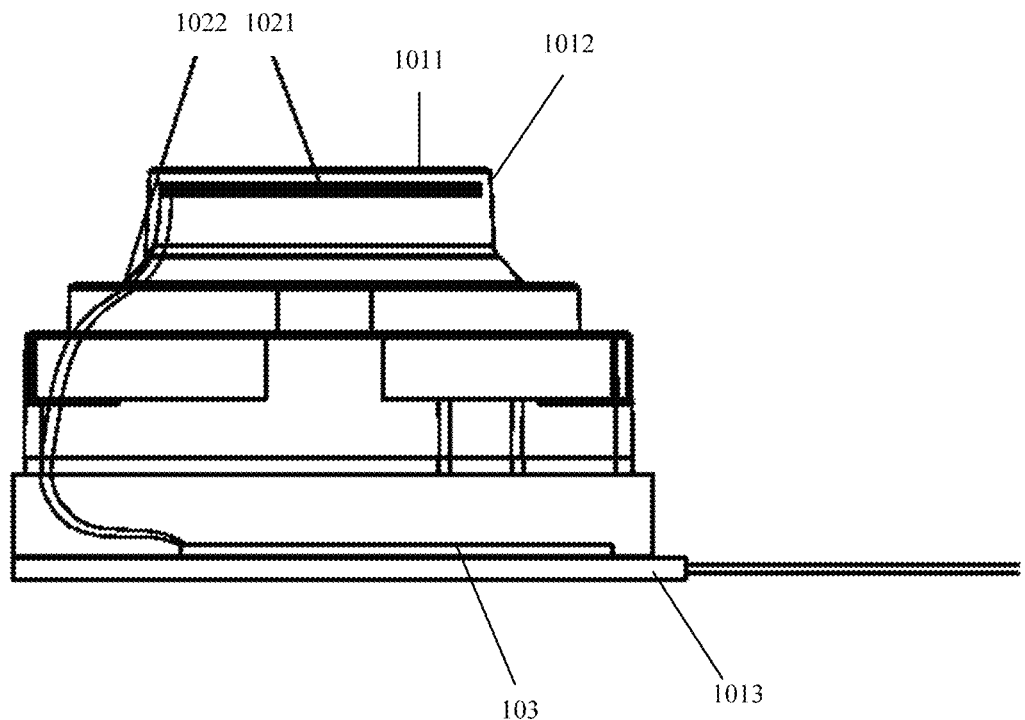
FIG. 2 is a cross-sectional schematic view of a longitudinal section of a camera device according to some embodiments of the present disclosure.

Reference is made to FIG. 2, which shows a cross-sectional schematic view of a longitudinal section of a camera device according to some embodiments of the present disclosure.

In the embodiments of the present disclosure, referring to FIG. 2, a description will be given by taking the photosensitive sensor arranged inside the lens module as an example. As shown in FIG. 2, the camera device includes the lens module, the light-guiding tube, and the photosensitive sensor 103.

The lens module includes the light-entering hole 1011 formed by a plurality of lenses, the housing 1012 which is used to fix the lenses, a camera sensor and the circuit board 1013, in which the camera sensor is not shown in FIG. 2. The light-guiding tube includes a first light-guiding segment 1021 and a second light-guiding segment 1022. The first light-guiding segment and the second light-guiding segment together form the light-guiding tube as a whole structure.

The first light-guiding segment 1021 is arranged at the periphery of the light-entering hole 1011 of the lens module; the second light-guiding segment 1022 and the photosensitive sensor 103 are arranged inside the lens module; and the second light-guiding segment 1022 is connected to the photosensitive sensor 103. The camera sensor and photosensitive sensor 103 may upload the detected signal to the main board of the mobile terminal through the circuit board 1013. Optionally, both the camera sensor and the photosensitive sensor 103 are arranged on the circuit board 1013, thereby ensuring the fixing of the two sensors more secure. The first light-guiding segment 1021 receives the light from outside. The light received from outside is guided into the photosensitive sensor 103 through the second light-guiding segment 1022, and the light intensity is detected by the photosensitive sensor 103. The second light-guiding segment 1022 may be arranged inside the housing 1012, that is, a casing of the housing 1012 encloses the second light-guiding segment 1022, which can avoid the influence of the illumination of the second light-guiding segment 1022 on the camera sensor. The second light-guiding segment 1022 may also be arranged along an inner wall of the housing 1012, and a surface of the second light-guiding segment is covered with a light-shielding layer. The light-shielding layer may be made of ink or other substance that can reduce light leakage by surrounding the light-shielding layer, which can effectively prevent the light from the second light-guiding segment 1022 adversely affecting the camera sensor.

In a specific implementation, the first light-guiding segment 1021 may completely surround the light-entering hole 1011; or the first light-guiding segment 1021 may also partially surround the light-entering hole 1011. Those skilled in the art can set a surrounding range according to actual needs.

Optionally, an outer surface of the first light-guiding segment 1021 is covered with a one-way light-guiding coating. The one-way light-guiding coating can hide the first light-guiding segment without affecting the first light-guiding segment 1021 receiving the light from outside. The one-way light-guiding coating guides the light outside of the lens module into the first light-guiding segment 1021, and prevents the light exiting from the light-guiding tube from diverging outward.

The one-way light-guiding coating may be a reflective one-way vision film or a one-way vision film (also referred to as one-way vision see-through film). In a specific implementation, a width of the light-guiding tube can be set by those skilled in the art according to actual requirements, and optionally, the width of the light-guiding tube may be set to 1 to 2 mm. In the specific implementation, if the width of the light-guiding tube is set too small, the first light-guiding segment has a poor capability of absorbing visible light, which may affect the detection result of the photosensitive sensor device. If the width of the light-guiding tube is set too large, a layout space inside the mobile terminal may be excessively occupied.

The reflective one-way version film is made of a reflective material, a black-and-white film, a release layer and a through hole. The reflective material is a reflective material of a microprism structure of a crystal color grid series, which belongs to a diamond grade reflective material. The black-and-white film is made of PET (Polyethylene terephthalate). The colors of two sides of the black-and-white film are different. A white surface is on one side, which has a good reflective effect; and a black surface is on the other side, which can hardly reflect light. The other side of the black-and-white film may also be made into a black reflective surface, which has good light-shielding effect for optical products. The release layer is a commonly used structure for thermal transfer, and a base substrate of the release layer is PET. The release layer is formed by coating a silicone oil, so the release layer is also called a silicone oil film. The release layer has good adsorbability and strong stickiness. The through hole is used to achieve an effect that it is visible from one-way.

The one-way vision film, also referred to as one-way film, mirror film, etc., refers to a film that is attached to a glass to make the glass have a high reflectance to the visible light. The one-way vision film can realize that, when the outside is brighter than an indoor room, a one-way vision glass is similar to an ordinary mirror, and a scene of the indoor room cannot be seen from the outside, but a scene of the outside can be seen clearly from the indoor room. Nowadays, the one-way vision film is generally applied in glass films in home life. In embodiments of the present disclosure, the one-way vision film is attached to the outer surface of the first light-guiding segment.

The camera device of the present disclosure has been illustrated in the above-mentioned embodiments by referring to FIG. 2 and by taking the photosensitive sensor arranged inside the lens module as an example. In a specific implementation, the photosensitive sensor may also be arranged outside the lens module, such as on a step formed by stacking various layers of the lens. The light-guiding tube may still be set to include the first light-guiding segment and the second light-guiding segment; the first light-guiding segment is arranged at the periphery of the light-entering hole of the lens module; the second light-guiding segment is connected to the photosensitive sensor of a photosensitive group. For the specific arrangement of the first light-guiding segment and the second light-guiding segment, reference may be made to the above related descriptions, and details are not described herein again.

In the mobile terminal including the camera device provided by some embodiments of the present disclosure, the light-guiding tube is arranged at the periphery of the light-entering hole of the lens module. The light-guiding tube is connected to the photosensitive sensor, and the photosensitive sensor and the circuit board of the lens module are connected to the camera device. Thus, the camera device has the picture shooting function and the light intensity detecting function. On the panel of the mobile terminal, it is not necessary to provide the openings for the photosensitive sensor device and the camera device respectively, and only one camera hole is needed to be provided, which can reduce the number of openings in a panel of the mobile terminal, thereby improving an appearance of the whole mobile terminal.

Figure 3:
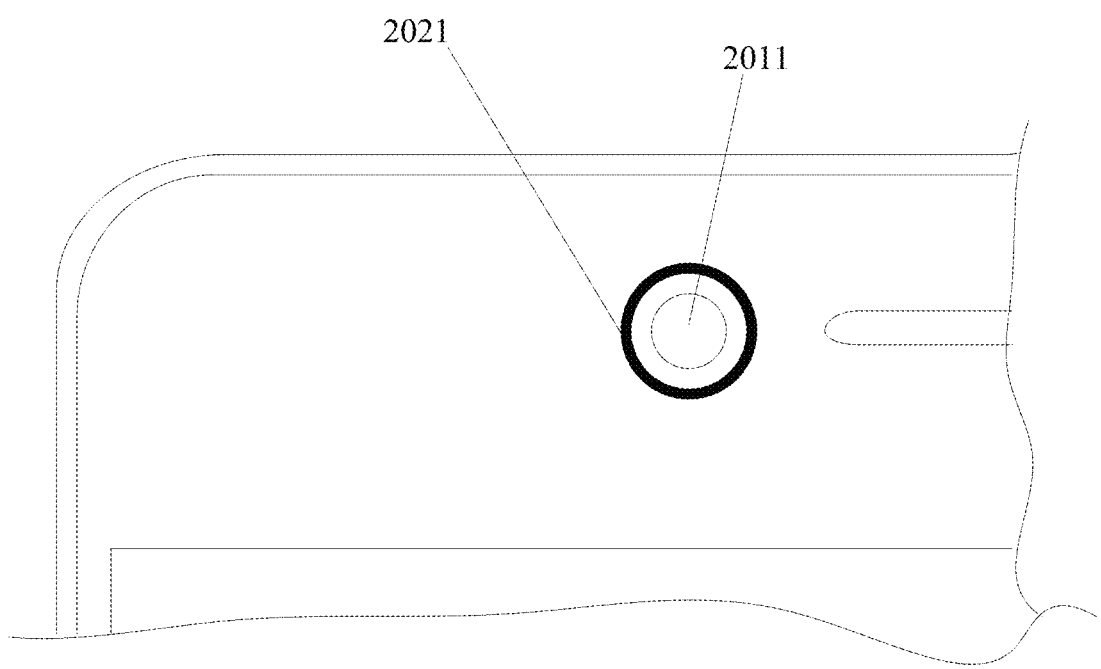
FIG. 3 is a partial schematic view of an outer surface of a mobile terminal according to some embodiments of the present disclosure.

FIG. 3 shows a partial schematic view of an outer surface of a mobile terminal according to some embodiments of the present disclosure.

The mobile terminal according to the embodiments of the present disclosure includes the camera device. The camera hole is provided on the cover of the mobile terminal (since the camera device has been fixed in the camera hole, the camera hole is not shown in FIG. 3). The camera device is fixed inside the mobile terminal, and the light-entering hole 2011 of the lens module included in the camera device and the camera hole directly face to the light-guiding tube 2021.

In a specific implementation, an outer surface of the light-guiding tube 2021 directly facing to the camera hole may be covered with a one-way light-guiding coating; or the surface of the cover of the mobile terminal directly facing to the light-guiding tube 2021 may be covered with the one-way light-guiding coating. The one-way light-guiding coating guides the light from the outside of the mobile terminal into the inside of the mobile terminal. An area of the camera hole can be visually reduced by both of the above methods.

The camera device includes the lens module, the photosensitive sensor and the light-guiding tube. The lens module includes the circuit board and the camera sensor. Both the camera sensor and the photosensitive sensor are arranged on the circuit board. For other specific structures of the camera device, the related description in the above embodiments can be referred, and details are not described herein again in the embodiments of the present disclosure.

In embodiments of the present disclosure, the mobile terminal further includes a main board; the main board is connected to the circuit board of the lens module, and receives the signals uploaded by the photosensitive sensor and the camera sensor. The mobile terminal in embodiments of the present disclosure may be at least one of a mobile phone, a tablet computer and an electronic book (e-book).

The light-guiding tube is arranged at the periphery of the light-entering hole of the lens module by the mobile terminal provided by the embodiments of the present disclosure. The light-guiding tube is connected to the photosensitive sensor, and the photosensitive sensor and the circuit board of the lens module are connected to the camera device. Thus, the camera device has the picture shooting function and the light intensity detecting function. On the panel of the mobile terminal, it is not necessary to provide the openings for the photosensitive sensor device and the camera device respectively, and only one camera hole is needed to be provided, which can reduce the number of openings in a panel of the mobile terminal, thereby improving an appearance of the whole mobile terminal.

In the description provided herein, numerous specific details are described. It is understood that the embodiments of the present disclosure may be practiced without these specific details. In some embodiments, well-known methods, structures and techniques have not been shown in detail so as not to obscure the description.

Similarly, it should be understood that, in order to simplify the present disclosure and to assist in understanding one or more of the various disclosure aspects, in the above description of the exemplary embodiments of the present disclosure, various features of the present disclosure are sometimes grouped together into a single embodiment, figure or description thereof. However, the method of the present disclosure should not be interpreted to reflect the following intent: the present disclosure, which is protected, is required to recite more features than those explicitly recited in each claim. As reflected in the claims, the disclosure aspects are less than all of the features of the single embodiment disclosed above. Therefore, the claims following the specific embodiments are hereby explicitly incorporated into the specific embodiments, and each of the claims as is regarded as a single embodiment of the present disclosure.

Those skilled in the art should understand that, modules in the devices in the embodiments are adaptively changed and placed in one or more devices different from the embodiments. The modules or units or components in the embodiments can be combined into one module or unit or component, and they also can be divided into a plurality of sub-modules or sub-units or sub-components. In addition to such features and/or at least some of the processes or units being mutually exclusive, all of the features disclosed in this specification, including the claims, the abstract and the drawings, as well as any processes or units of any of the methods or devices disclosed, may be combined in any combination. Unless otherwise defined explicitly, each feature disclosed in the present specification, including the claims, the abstract and the drawings, can be replaced by the alternative feature that provides the same, equivalent or similar purpose.

Besides, those skilled in that art should understand that, although some embodiments described herein include some features of the other embodiments, rather than the other features, the combinations of the features of the different embodiments are intended to be within the scope of the present disclosure. For example, in the claims, any one of the claimed embodiments can be used in any combination.

It should be noted that the above-described embodiments are illustrative to the present disclosure and are not intended to limit the scope of the present disclosure, and those skilled in the art can devise alternative embodiments without departing from the scope of the appended claims. In the claims, any reference signs placed between parentheses shall not be considered as a limitation. The word "comprising" does not exclude the presence of the elements or steps that are not recited in the claims. The word "a" or "an" in front of the units does not exclude the presence of a plurality of such elements. The present disclosure can be implemented by means of hardware including several distinct elements and by means of a suitably programmed computer. In the claims of the units including several means, several of these means can be embodied by the same hardware item. The use of the words first, second, and third does not indicate any order. These words can be interpreted as names.

What is claimed is:

1. A camera device, comprising a lens module, a light-guiding tube and a photosensitive sensor;
   wherein the light-guiding tube is arranged at a periphery of a light-entering hole of the lens module, and the light-guiding tube is connected to the photosensitive sensor; and
   the photosensitive sensor is connected to a circuit board of the lens module;
   wherein the light-guiding tube comprises a first light-guiding segment and a second light-guiding segment;
   the first light-guiding segment is arranged at the periphery of the light-entering hole of the lens module; and
   the second light-guiding segment and the photosensitive sensor are arranged inside the lens module, and the second light-guiding segment is connected to the photosensitive sensor; or, the photosensitive sensor is arranged outside the lens module, and the second light-guiding segment is connected to the photosensitive sensor.

2. The device according to claim 1, wherein
the lens module further comprises a camera sensor; and
the camera sensor and the photosensitive sensor are arranged on the circuit board of the lens module.

3. The device according to claim 1, wherein the first light-guiding segment completely surrounds the light-entering hole, or the first light-guiding segment partially surrounds the light-entering hole.

4. The device according to claim 1, wherein an outer surface of the first light-guiding segment is provided with a one-way light-guiding coating, and the one-way light-guiding coating guides light from an external of the lens module into the first light-guiding segment.

5. The device according to claim 4, wherein the one-way light-guiding coating is a one-way vision reflective film or a one-way vision film.

6. The device according to claim 1, wherein the first light-guiding segment completely surrounds the light-entering hole, or the first light-guiding segment partially surrounds the light-entering hole.

7. The device according to claim 1, wherein an outer surface of the first light-guiding segment is provided with a one-way light-guiding coating, and the one-way light-guiding coating guides light from an external of the lens module into the first light-guiding segment.

8. A mobile terminal, comprising a camera device, wherein
the camera device comprises a lens module, a light-guiding tube and a photosensitive sensor;
the light-guiding tube is arranged at a periphery of a light-entering hole of the lens module, and the light-guiding tube is connected to the photosensitive sensor;
the photosensitive sensor is connected to a circuit board of the lens module;
the camera device is installed inside the mobile terminal, and a camera hole is arranged on a cover plate of the mobile terminal; and
both the light-entering hole and the light-guiding tube arranged at the periphery of the light-entering hole face to the camera hole;
wherein the light-guiding tube comprises a first light-guiding segment and a second light-guiding segment;
the first light-guiding segment is arranged at the periphery of the light-entering hole of the lens module; and
the second light-guiding segment and the photosensitive sensor are arranged inside the lens module, and the second light-guiding segment is connected to the photosensitive sensor; or,
the photosensitive sensor is arranged outside the lens module, and the second light-guiding segment is connected to the photosensitive sensor.

9. The mobile terminal according to claim 8, wherein
a one-way light-guiding coating covers a surface of the cover plate facing to the light-guiding tube; and the one-way light-guiding coating guides light from an external of the mobile terminal into an inside of the mobile terminal.

10. The mobile terminal according to claim 8, further comprising a main board, wherein the main board is connected to the circuit board of the lens module, and receives signals sent by the photosensitive sensor and a camera sensor.

11. The mobile terminal according to claim 8, wherein
the lens module further comprises a camera sensor; and
the camera sensor and the photosensitive sensor are arranged on the circuit board of the lens module.

12. The mobile terminal according to claim 8, wherein the first light-guiding segment completely surrounds the light-entering hole, or the first light-guiding segment partially surrounds the light-entering hole.

13. The mobile terminal according to claim 8, wherein an outer surface of the first light-guiding segment is provided with a one-way light-guiding coating, and the one-way light-guiding coating guides light from an external of the lens module into the first light-guiding segment.

14. The mobile terminal according to claim 13, wherein the one-way light-guiding coating is a one-way vision reflective film or a one-way vision film.

15. The mobile terminal according to claim 8, wherein the first light-guiding segment completely surrounds the light-entering hole, or the first light-guiding segment partially surrounds the light-entering hole.

16. The mobile terminal according to claim 8, wherein an outer surface of the first light-guiding segment is provided with a one-way light-guiding coating, and the one-way light-guiding coating guides light from an external of the lens module into the first light-guiding segment.

* * * * *